United States Patent [19]
Chen et al.

[11] Patent Number: 6,010,795
[45] Date of Patent: Jan. 4, 2000

[54] MAGNETIC RECORDING MEDIUM COMPRISING A NICKEL ALUMINUM OR IRON ALUMINUM UNDERLAYER AND CHROMIUM CONTAINING INTERMEDIATE LAYER EACH HAVING (200) DOMINANT CRYSTALOGRAPHIC ORIENTATION

[75] Inventors: Qixu Chen, Milpitas; Jyh-Kau Chang, Fremont; Charles Leu, Fremont; Ga-Lane Chen, Fremont, all of Calif.

[73] Assignee: Seagate Technology, Inc., Scotts Valley, Calif.

[21] Appl. No.: 08/945,084

[22] PCT Filed: Feb. 26, 1997

[86] PCT No.: PCT/US97/02169

§ 371 Date: Oct. 17, 1997

§ 102(e) Date: Oct. 17, 1997

[87] PCT Pub. No.: WO98/16923

PCT Pub. Date: Apr. 23, 1998

[51] Int. Cl.[7] ................................. G11B 05/704
[52] U.S. Cl. .................. 428/611; 428/667; 428/694 TS; 428/900
[58] Field of Search ................... 428/611, 667, 428/694 TS, 900

[56] References Cited

U.S. PATENT DOCUMENTS

| | | | |
|---|---|---|---|
| 4,900,397 | 2/1990 | Werner et al. | 156/643 |
| 5,273,834 | 12/1993 | Hoover et al. | |
| 5,302,434 | 4/1994 | Doerner et al. | 428/64 |
| 5,496,632 | 3/1996 | Yamaguchi et al. | 428/332 |
| 5,536,585 | 7/1996 | Futamoto et al. | 428/611 |
| 5,693,426 | 12/1997 | Lee et al. | |
| 5,733,370 | 3/1998 | Chen et al. | 47/105 |

OTHER PUBLICATIONS

Wong et al., "Investigation of CONiCr Thin Films Deposited on [100] and [110] Cr Single Crystals," IEEE Transactions on Magnetics, vol. 27, No. 6, Nov. 1991, pp. 4733–4735.

Mirzamaani et al., "Magnetic properties of CoPtCr thin films with <1120> crystal orientation," J. Appl. Phys. 69 (8), Apr. 15, 1991, pp. 5169–5171.

Min et al., "Bicrystal advanced thin–film media for high density recording," J. Appl. Phys. 75 (10), May 15, 1994, pp. 6129–6131.

Ding et al., "Microstructure and Recording Properties of Bicrystal Disks with GaAs Substrates," IEEE Transactions on Magnetics, vol. 30, No. 6 Nov. 6, 1994, pp. 3978–3980.

Futamoto et al., "Magnetic and Recording Characteristics of Bicrystalline Longitudinal Recording Medium Formed on an MgO Single Crystal Disk Substrate,"IEEE Transactions on Magnetics, vol. 30, No. 6, Nov. 6, 1994, pp. 3975–3977.

Ye et al., "Modeling of thin–film media with advanced microstructure for ultrahigh density recording," J. Appl. Phys. 75 (10), May 15, 1994, pp. 6135–6137.

Nolan et al., "Effect of microstructural features on media noise in longitudinal recording media," J. Appl. Phys. 73 (10), May 15, 1993, pp. 5566–5568.

Peng et al., "Micromagnetic and Experimental Studies of CoPtCr Bicrystal Thin Film Media," (JA–01, Intermag Conference, San Antonio, Texas, Apr. 1995).

(List continued on next page.)

*Primary Examiner*—Steven A. Resan
*Attorney, Agent, or Firm*—McDermott, Will & Emery

[57] ABSTRACT

A magnetic recording medium is formed by depositing a Cr-containing sub-underlayer on a surface oxidized seed layer, such as NiP, with direct current (DC) magnetron sputtering, depositing a NiAl or FeAl underlayer on the sub-underlayer, and depositing a Cr-containing intermediate layer on the NiAl or FeAl underlayer. The medium features high coercivity, low noise, and (200)-dominant underlayer crystallographic orientation, even with sub-underlayer deposition at temperatures as low as about 25° C. The medium is suitable for high density longitudinal magnetic recording.

23 Claims, 10 Drawing Sheets

OTHER PUBLICATIONS

Hosoe et al., "Bicrystal Cluster Structure and Magnetic Properties of CoCrTa/Cr Thin Film Media," (JA–02, Intermag Conference, San Antonio, TX, Apr. 1995).

Ding et al., "Fabrication and Recording Performances of Bicrystal Disks on GaAs Substrates," Journal of The Magnetics Society of Japan, vol. 18, Supple., No. S1 (1994).

Ding et al., "Experimental Study on Recording and Track Edge Charactistics of Bicrystal Thin Film Media," IEEE Trans. Magn., MAG–31, p. 2827, 1995.

Lee et al., "NiAl Underlayers For CoCrTa Magnetic Thin Films", IEEE Transactions on Magnetics, vol. 30, No. 6, pp. 3951–3953, Nov. 1994.

Lee et al., "Effects of Cr Intermediate Layers on CoCr Pt Thin Film Media on NiAl Underlayers," vol. 31, No. 6, Nov. 1995, pp. 2728–2730.

Lee et al., "Seed layer induced (002) crystallographic texture in NiAl underlayers," J. Appl. Phys. 79 (8) , Apr. 15, 1996, pp. 4902–4904.

Laughlin et al., "The Control and Characterization of the Crystallographic Texture of the Longitudinal Thin Film Recording Media," IEEE Transactions on Magnetics, vol. 32, No. 5, Sep. 1996, pp. 3632–3637.

Lee et al., "FeAl underlayers for CoCrPt thin film longitudinal media," CC–01, 41st Annual Conference on Magnetism and Magnetic Materials, Atlanta, Georgia, Nov. 12–15, 1996.

Chen et al., "Thin Film Media With and Without Bicrystal Cluster Structure on Glass Ceramic Substrates," Intermag Conference GC–6, Seattle, Apr. 1996 (3 pages).

Laughlin, et al., "Epitaxy and Crystallographic Texture of Thin Films for Magnetic Recording," Material Research Society Symposium, vol. 343, 1994, pp. 327–337.

Chen et al., "The Micromagnetic Properties of High–Coercivity Metallic Thin Films and Their Effects on the Limit of Packing Density in Digital Recording," IEEE Transactions on Magnetics, vol. MAG–17, No. 2, Mar. 1981, pp. 1181–1191.

Miles et al., "The Effect of Cluster Size of Thin Film Media Noise," IEEE Transactions on Magnetics, vol. 31, No. 2, Mar. 1995, pp. 1013–1023.

Yahisa et al., "Electron Spectroscopic Imaging Analysis of Compositional Inhomogeneity in CoCrTa Longitudinal Thin Film Media," IEEE Transactions on Magnetics, vol. 31, No. 6, Nov. 1995, pp. 2836–2838.

Chang et al., "Evolution of Bicrystal Media Development," TMR Conference, Santa Clara, 1996 (6 pages).

MAGNETIC RECORDING MEDIUM COMPRISING A NICKEL ALUMINUM OR IRON ALUMINUM UNDERLAYER AND CHROMIUM CONTAINING INTERMEDIATE LAYER EACH HAVING (200) DOMINANT CRYSTALOGRAPHIC ORIENTATION

RELATED APPLICATION

This application relates to PCT International Application Ser. No. PCT/US97/02169 filed Feb. 26, 1997, entitled "THIN FILM MEDIA CONTAINING NICKEL ALUMINUM UNDERLAYER."

TECHNICAL FIELD

This application claims priority from U.S. Provisional Pat. Application Ser. No. 60/028,882, filed Oct. 17, 1996.

The present invention relates to a magnetic recording medium, such as a thin film magnetic recording disk, and to a method of manufacturing the medium. The invention has particular applicability to a magnetic recording medium exhibiting low noise, high coercivity and high recording density.

BACKGROUND ART

The requirements for high areal recording density impose increasingly greater requirements on thin film magnetic recording media in terms of coercivity, remanent squareness, low medium noise and narrow track recording performance. It is extremely difficult to produce a magnetic recording medium satisfying such demanding requirements, particularly a high density magnetic rigid disk medium for longitudinal recording.

The linear recording density can be increased by increasing the coercivity of the magnetic recording medium. However, this objective can only be accomplished by decreasing the medium noise, as by maintaining very fine magnetically noncoupled grains. Medium noise is a dominant factor restricting increased recording density of high density magnetic hard disk drives. Medium noise in thin films is attributed primarily to inhomogeneous grain size and intergranular exchange coupling. Therefore, in order to increase linear density, medium noise must be minimized by suitable microstructure control.

A conventional longitudinal recording disk medium is depicted in FIG. 1 and typically comprises a non-magnetic substrate 10 having sequentially deposited thereon a plating 11, such as a plating of amorphous nickel-phosphorous (NiP), and underlayer 12, such as chromium (Cr) or a Cr-alloy, a magnetic layer 13, typically comprising a cobalt (Co) alloy, and a protective overcoat 14, typically containing carbon. Conventional practices also comprise bonding a lubricant topcoat (not shown) to the protective overcoat. Underlayer 12, magnetic layer 13 and protective overcoat 14 are typically deposited by sputtering techniques. The Co alloy magnetic layer deposited by conventional techniques normally comprises polycrystallites epitaxially grown on the polycrystal Cr or Cr-alloy underlayer.

It is recognized that the relevant magnetic properties, such as coercivity (Hc), magnetic remanence (Mr) and coercive squareness (S*), which are critical to the performance of a Co base alloy magnetic thin film, depend primarily on the microstructure of the magnetic layer which, in turn, is influenced by the underlayer on which it is deposited. Conventional underlayers include Cr, molybdenum (Mo), tungsten (W), titanium (Ti), chromium-vanadium (CrV) as well as Cr alloyed with various substitutional elements. It is recognized that underlayers having a fine grain structure are highly desirable, particularly for growing fine grains of hexagonal close packed (HCP) Co deposited thereon.

It has been reported that nickel-aluminum (NiAl) films exhibit a grain size which is smaller than similarly deposited Cr films which are the underlayer of choice in producing conventional magnetic recording media. Li-Lien Lee et al., "NiAl Underlayers For CoCrTa Magnetic Thin Films", IEEE Transactions on Magnetics, Vol. 30, No. 6, pp. 3951–3953, 1994.

Accordingly, NiAl thin films are potential candidates as underlayers for magnetic recording media for high density longitudinal magnetic recording. Such a magnetic recording medium is schematically depicted in FIG. 2 and comprises substrate 20, NiAl underlayer 21 and cobalt alloy magnetic layer 22. However, it was found that the coercivity of a magnetic recording medium comprising an NiAl underlayer, such as that depicted in the FIG. 2, is too low for high density recording, e.g. about 2000 Oersteds.

Lee et al. subsequently reported that the coercivity of a magnetic recording medium comprising an NiAl underlayer can be significantly enhanced by depositing a plurality of underlayers containing alternative NiAl and Cr layers rather than a single NiAl underlayer. Li-Lien Lee et al., "Effects of Cr Intermediate Layers on CoCrPt Thin Film Media on NiAl Underlayers," Vol. 31, No. 6, November 1995, pp. 2728–2730. Such a magnetic recording medium comprising an alternative NiAl layer and Cr layer composite structure is schematically illustrated in FIG. 3.

Adverting to FIG. 3, the depicted magnetic recording medium comprises substrate 30 having sequentially formed thereon Cr sub-underlayer 31, NiAl underlayer 32, Cr intermediate layer 33, and Co alloy magnetic layer 34. It was found, however, that such a magnetic recording medium is characterized by an underlayer structure exhibiting a (110)-dominant crystallographic orientation which does not induce the preferred (11$\bar{2}$0)-dominant crystallographic orientation in the subsequently deposited Co alloy magnetic layer and is believed to contribute to increased media noise. Li-Lien Lee et al. were able to obtain an underlayer exhibiting a (200)-dominant crystallographic orientation by initially depositing a Cr sub-underlayer directly on the non-magnetic substrate at an undesirably high temperature of about 260° C. using radio frequency (RF) sputtering. However, deposition of a Cr sub-underlayer at such an elevated temperature undesirably results in significantly larger grains than grains resulting from deposition at lower temperatures, e.g. approximating room temperature (25° C.). The formation of larger grains is inconsistent with the very reason for employing NiAl as an underlayer. On the other hand, it is very difficult to obtain Cr (200) crystallographic orientation, even at elevated temperature such as 260° C., on glass and glass ceramic substrates using direct current (DC) magnetron sputtering, which is widely employed in the magnetic recording media industry.

Li-Lien Lee et al. recognized the undesirability of resorting to high deposition temperatures to obtain a (200)-dominant crystallographic orientation in the underlayer structure. It was subsequently reported that an underlayer structure exhibiting a (200)-dominant crystallographic orientation was obtained by depositing a magnesium oxide (MgO) seed layer using radio frequency (RF) sputtering. Li-Lien Lee et al., "Seed layer induced (002) crystallographic texture in NiAl underlayers," J. Appl. Phys. 79 (8), Apr. 15, 1996, pp. 4902–4904; and David E. Laughlin et al., "The Control and Characterization of the Crystallographic Texture of the Longitudinal Thin Film Recording Media," IEEE Transactions on Magnetics, Vol. 32, No. 5 September 1996, pp. 3632–3637. Such a magnetic recording medium comprising a MgO seed layer and NiAl underlayer is schematically illustrated in FIG. 4 and comprises MgO seed layer 41 deposited on substrate 40, NiAl underlayer 42 deposited on MgO seed layer 41, and cobalt alloy magnetic layer 43 deposited on NiAl underlayer 42. Such a magnetic recording medium, however is not commercially viable from an economic standpoint, because sputtering systems in place throughout the industry making magnetic recording media with the conventional structure of magnetic layers epitaxially formed on underlayers are based upon direct current (DC) sputtering. Accordingly, RF sputtering an MgO seed layer is not economically viable.

On the other hand, the objective of having a (200) crystallographic orientation in the underlayers is to induce $(11\bar{2}0)$ crystallographic orientation in the Co alloy layers. Even through media comprising an MgO seed layer and NiAl underlayer have a (200) crystallographic orientation in the underlayer, it does not have a dominant $(11\bar{2}0)$ crystallographic orientation in the Co alloy layer, according to Laughlin et al., "The Control and Characterization of the Crystallographic Texture of the Longitudinal Thin Film Recording Media," IEEE Transaction on Magnetics, Vol. 32, No. 5 September 1996, p. 3634. Laughlin et al. reported that the grain-to-grain epitaxial relationship between the (002) NiAl and the CoCrPt film is found to be $[10\bar{1}1]$ CoCrPt// [001] NiAl, and $(12\bar{1}0)$ CoCrPt//(100) NiAl, or $(12\bar{1}0)$ CoCrPt//(010) NiAl. In other words, Laughlin et al. reported that there is no $(11\bar{2}0)$ CoCrPt//(200) NiAl epitaxial relationship found in the films with MgO seed layers and NiAl underlayers. Rather, (200) orientation is identical with (002) orientation. When an FeAl underlayer is used instead of NiAl, it was reported that the (200) FeAl underlayer can only induce a weak $(11\bar{2}0)$ textured CoCrPt by employing a MgO seed layer or a (200) textured Cr seed layer. Li-Lien Lee et al., "FeAl underlayers for CoCrPt thin film longitudinal media," CC-01, 41st Annual Conference on Magnetism and Magnetic Materials, Atlanta, Ga., Nov. 12–15, 1996.

Co-pending application Ser. No. 08/735,443, filed on Jan. 2, 1997 (Our Docket No. 2674-047), discloses that Cr films deposited on surface oxidized NiP layers experience smaller grains than Cr films deposited on non-oxidized NiP layers. Co-pending application Ser. No. 08/586,529, filed on Jan. 16, 1996, discloses a method for depositing Cr films on surface oxidized NiP films, wherein the deposited Cr films exhibit a (200)-dominant crystallographic orientation.

There exists a need for a magnetic recording medium with an underlayer structure, comprising a small grain size NiAl or FeAl underlayer, formed by DC magnetron sputtering at low temperatures, e.g. at temperatures approximating room temperature, and exhibiting a (200)-dominant crystallographic orientation.

DISCLOSURE OF THE INVENTION

An object of the present invention is a magnetic recording medium comprising an NiAl or FeAl underlayer, exhibiting (200)-dominant crystallographic orientation, and a Co alloy layer, exhibiting high coercivity and suitable for high density longitudinal magnetic recording.

Another object of the present invention is a method of manufacturing a magnetic recording medium comprising an NiAl or FeAl underlayer, exhibiting (200)-dominant crystallographic orientation, and a Co alloy layer, exhibiting high coercivity and suitable for high density longitudinal magnetic recording.

Additional objects, advantages and other features of the invention will be set forth in part in the description which follows and in part will become apparent to those having ordinary skill in the art upon examination of the following only to be learned from the practice of the invention. The objects and advantages of the invention may be realized and obtained as particularly pointed out in the appended claims.

According to the present invention, the foregoing and other objects are achieved in part by a magnetic recording medium comprising: a non-magnetic substrate; a surface oxidized NiP seed layer formed on the non-magnetic substrate; a Cr or Cr alloy sub-underlayer formed on the surface oxidized NiP seed layer; a NiAl or FeAl underlayer formed on the sub-underlayer; a Cr or Cr alloy intermediate layer formed on the underlayer; and a cobalt alloy magnetic layer formed on the intermediate layer.

Additional objects and advantages of the present invention will become readily apparent to those skilled in this art from the following detailed description, wherein only the preferred embodiment of the invention is shown and described, simply by way of illustration of the best mode contemplated for carrying out the invention. As will be realized, the invention is capable of other and different embodiments, and its details are capable of modifications in various obvious respects, all without departing from the invention. Accordingly, the drawings and description are to be regarded as illustrative in nature, and not as restrictive.

DESCRIPTION OF THE INVENTION

Figure 1:
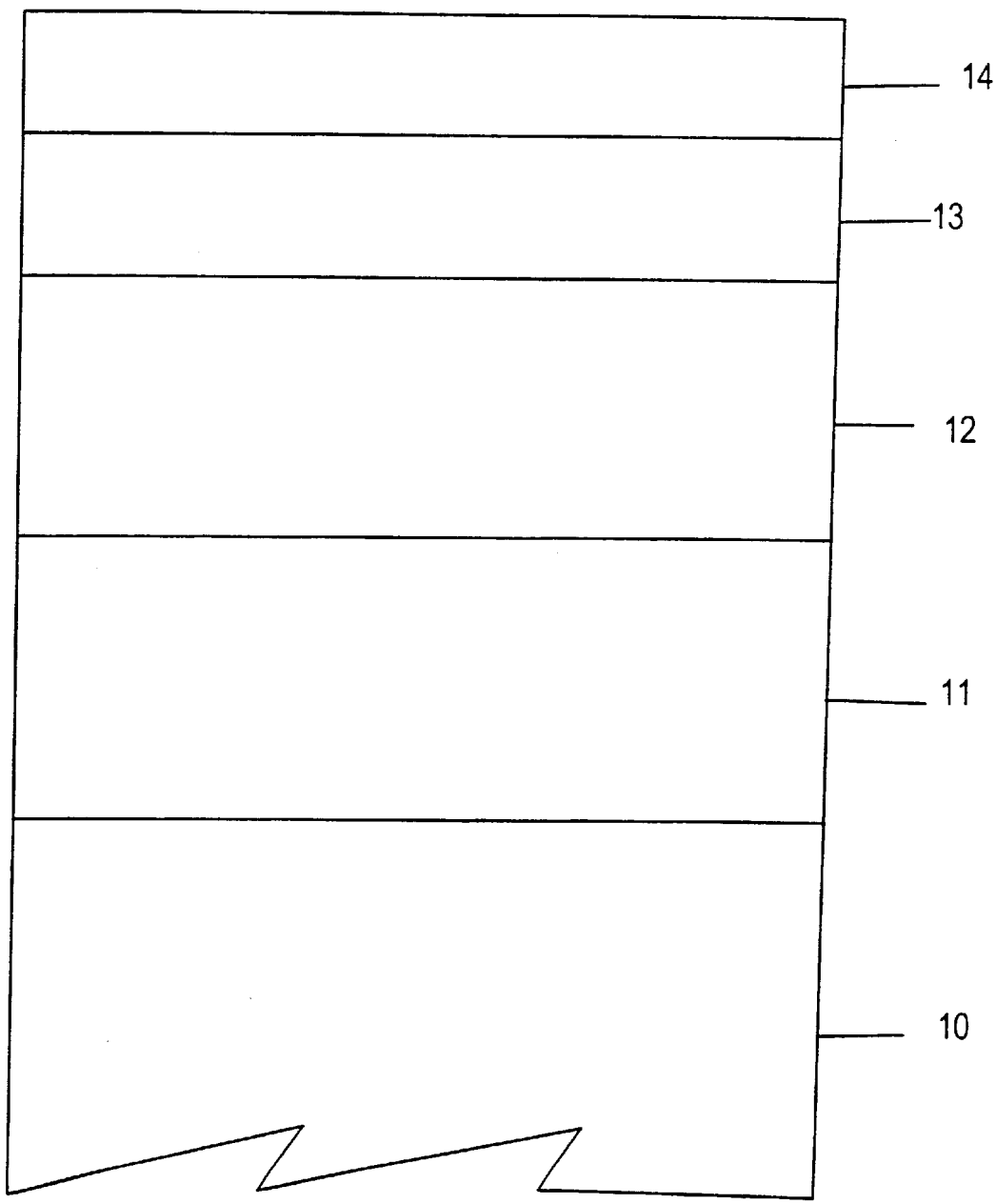
FIG. 1 schematically depicts a conventional magnetic recording medium structure.
Figure 2:
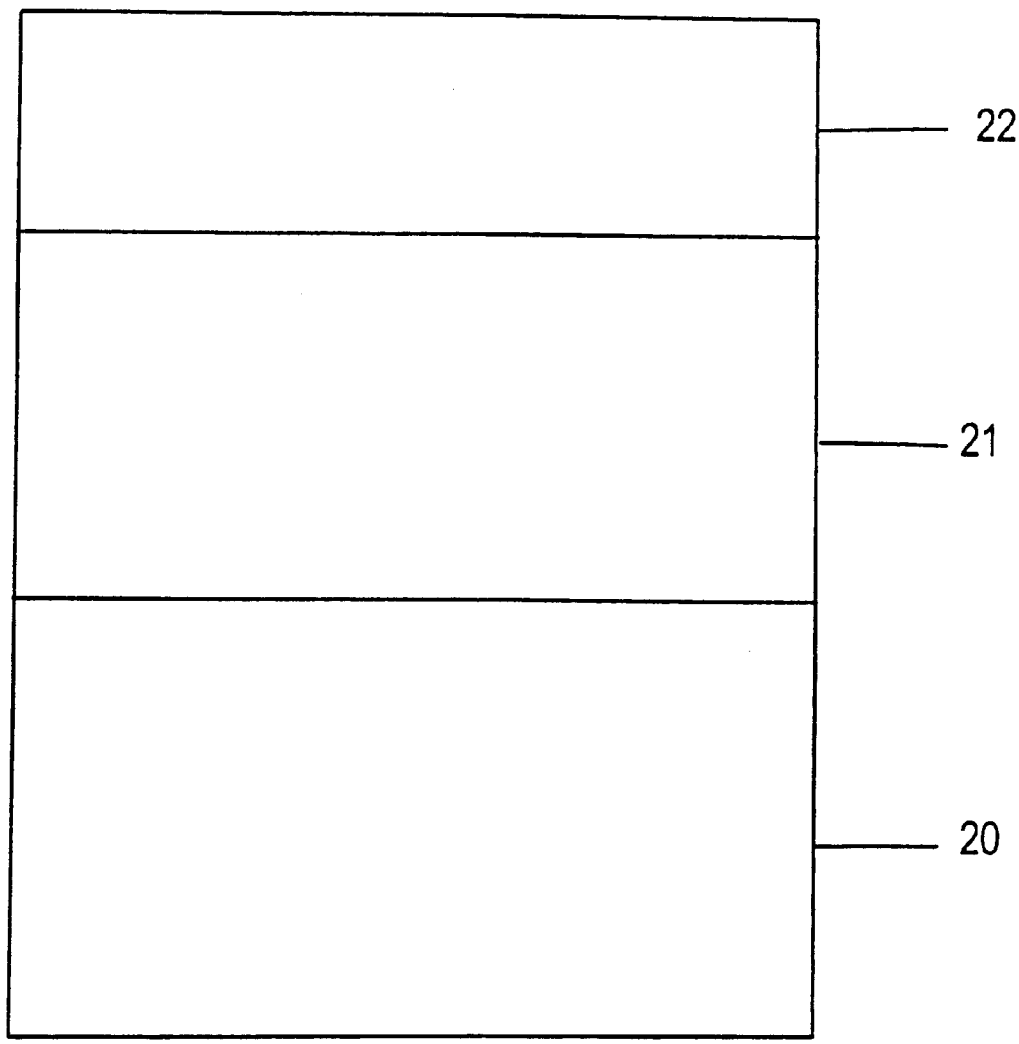
FIG. 2 schematically depicts a prior art magnetic recording medium containing an NiAl underlayer.
Figure 3:
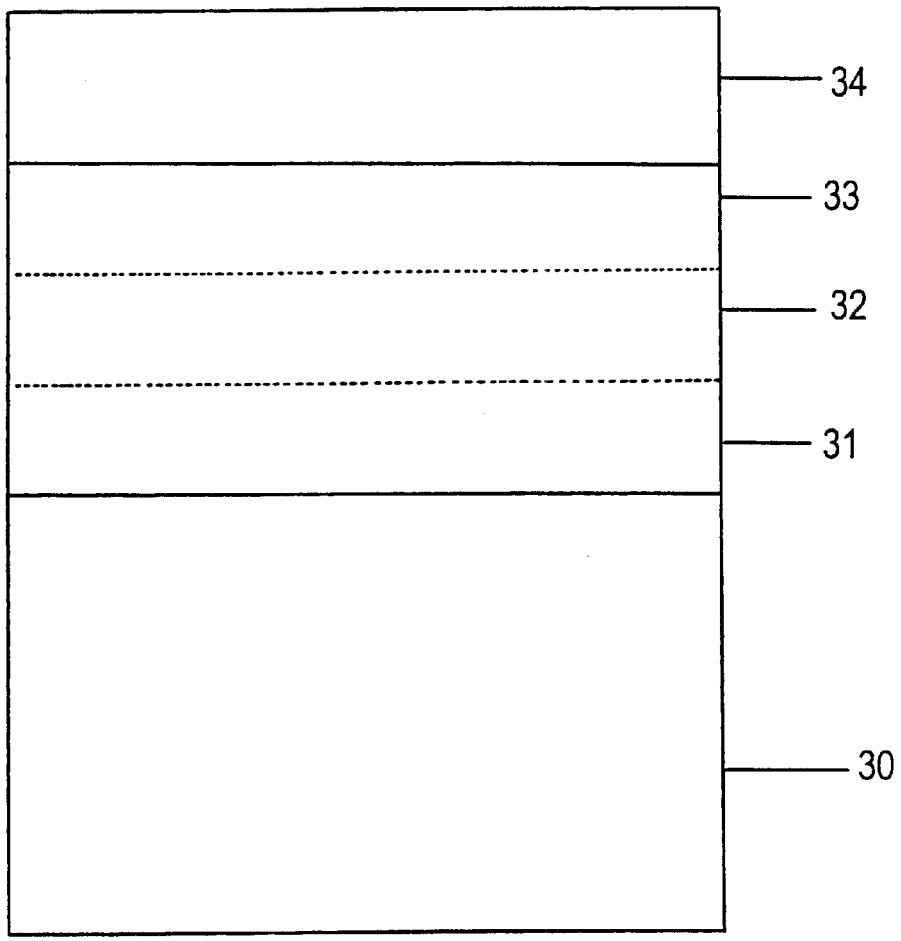
FIG. 3 schematically depicts a prior art magnetic recording medium comprising a composite NiAl/Cr underlayer structure.
Figure 4:
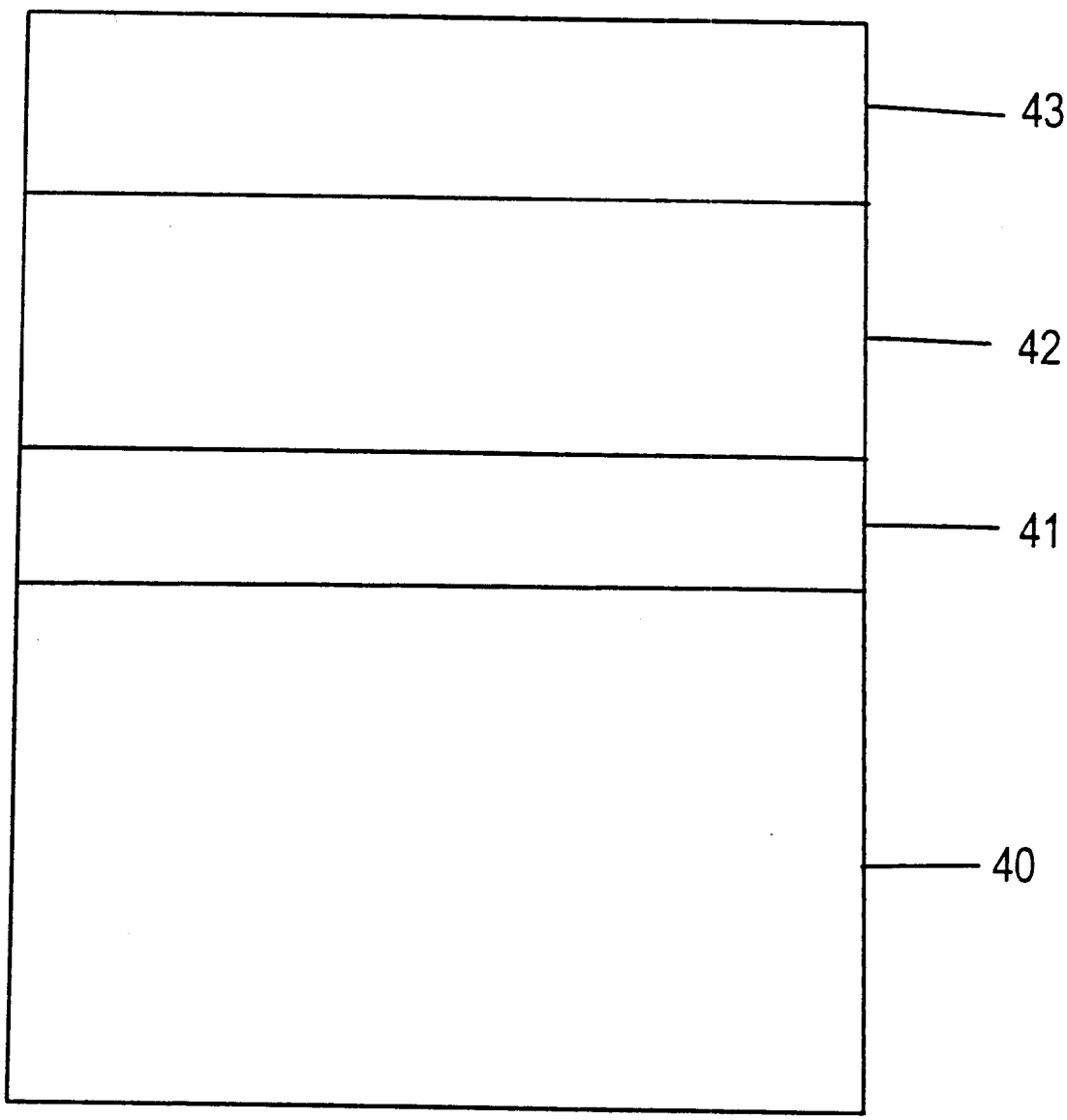
FIG. 4 schematically depicts a prior art magnetic recording medium comprising an NiAl underlayer and MgO seed layer.

The present invention provides a magnetic recording medium enjoying the advantages derived from a small grain size NiAl or FeAl underlayer while achieving low medium noise and high coercivity suitable for high density longitudinal magnetic recording. These advantages are achieved by the strategic utilization of a seed layer having an oxidized surface, e.g., a seed layer comprising NiP, a Cr or Cr-alloy sub-underlayer directly on the oxidized NiP seed layer and formed under the NiAl or FeAl underlayer utilizing DC magnetron sputtering, thereby obtaining an underlayer structure exhibiting a (200)-dominant crystallographic orientation, and a Cr or Cr-alloy intermediate layer on the NiAl or FeAl underlayer.

When a Cr or Cr-alloy sub-underlayer is deposited directly on the oxidized surface of the seed layer, the underlayer structure typically exhibits a small grain size and a (200)-dominant crystallographic orientation, even when sputtered at a low temperature. High coercivity is also achieved.

Any of various conventional magnetic alloys can be employed in forming the magnetic alloy layer of the present invention, such as magnetic Co alloys. The present invention further comprises providing a conventional protective overcoat, typically carbon or silicon oxide, and binding a lubricant top-coat thereon. The seed layer, composite underlayer structure comprising Cr sub-underlayer, NiAl or FeAl underlayer, and Cr intermediate layer, magnetic layer and carbon overcoat are typically sequentially sputter deposited on the substrate.

The present invention enables the use of low temperature DC magnetron sputtered deposition of a sub-underlayer directly on an oxidized seed layer, such as a Cr or Cr alloy sub-underlayer on a surface oxidized NiP seed layer, thereby achieving an underlayer structure exhibiting a (200)-dominant crystallographic orientation and a small grain size. The oxidized seed layer can be formed by sputter depositing an NiP seed layer in an inert gas, such as argon (Ar), followed by oxidation in an atmosphere comprising Ar and oxygen ($O_2$). Alternatively, the seed layer can be sputter deposited in an atmosphere comprising Ar and $O_2$, wherein an oxidized seed layer is deposited. As to techniques for oxidizing a deposited NiP seed layer, the entire disclosure of copending application Ser. No. 08/586,529 filed Jan. 16, 1996, and the entire disclosure of application Ser. No. 08/735,443 filed on Jan. 2, 1997 (Our Docket No. 2674-047), are incorporated herein. As to a method for depositing an oxidized seed layer, the entire disclosure of co-pending application Ser. No. 08/699,759 is incorporated herein.

Given the foregoing objectives and descriptions, one having ordinary skill in the art can easily optimize the thickness of the various layers. For example, the thickness of the oxidized seed layer can range from about 200 Å to about 2,000 Å, e.g., from about 300 Å to about 600 Å; the thickness of the composite underlayer structure can range from about 200 Å to about 3,000 Å, e.g., from about 275 Å to about 1,600 Å; the thickness of a sub-underlayer, normally Cr or Cr-alloy, can typically range from about 40 Å to about 1,000 Å, e.g. about 50 Å to about 100 Å; the NiAl underlayer can have a thickness of about 40 Å to about 3,000 Å, e.g. 200 Å to about 1,000 Å; and the thickness of the intermediate Cr or Cr-alloy layer can range from about 20 Å to about 2,000 Å, e.g. about 25 Å to about 500 Å. The thickness of each of the magnetic alloy layer, protective overcoat and lubricant topcoat is consistent with conventional practice.

Figure 5:
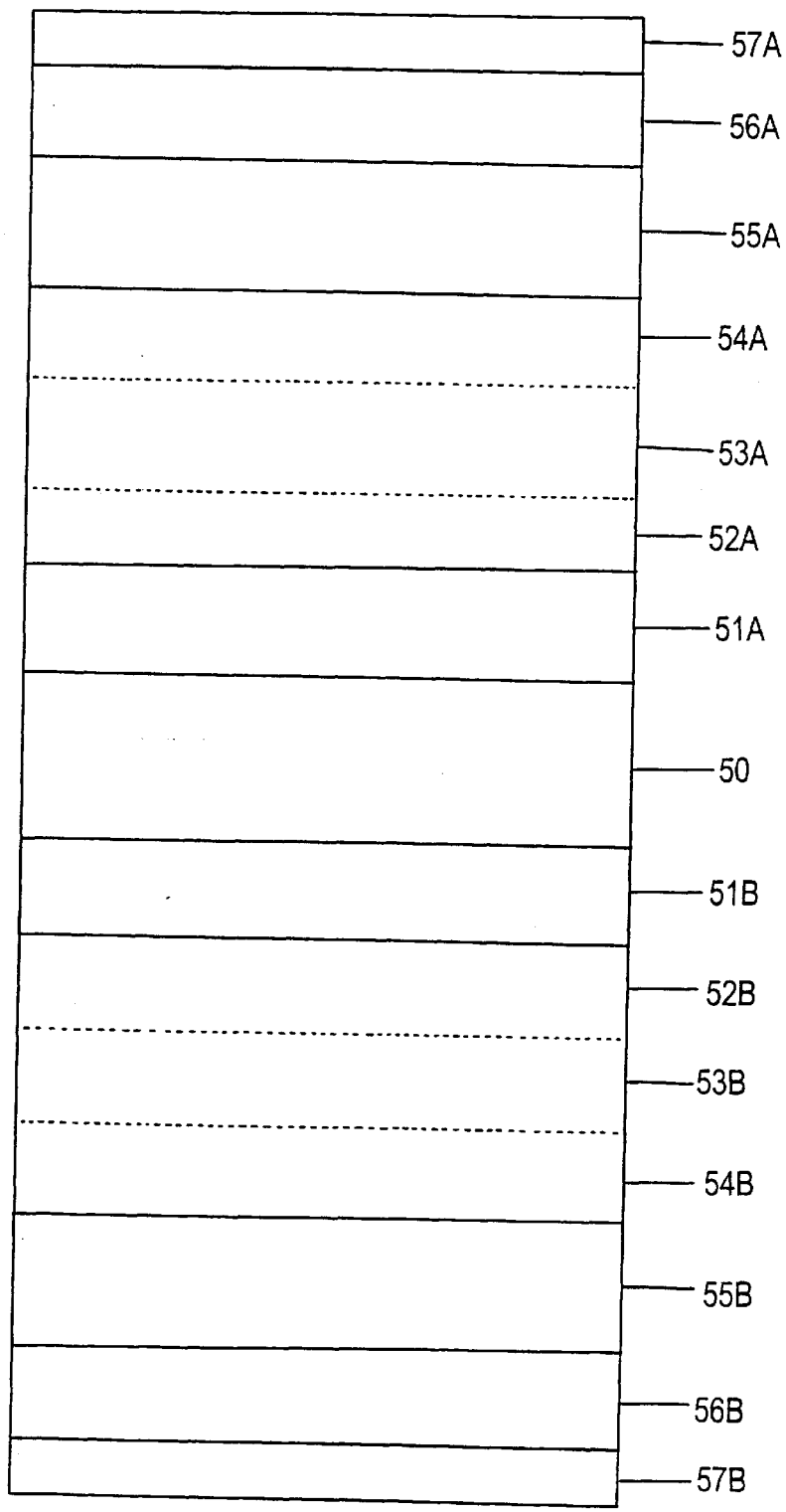
FIG. 5 schematically illustrates a magnetic recording medium in accordance with the present invention.

An embodiment of a magnetic recording medium in accordance with the present invention is schematically depicted in FIG. 5 and comprises non-magnetic substrate 50 with a plurality of sequentially deposited layers on each side thereof, consistent with conventional practices. According to the present invention, however, an initial surface oxidized seed layer 51A, 51B such as surface oxidized NiP, is formed on each side of non-magnetic substrate 50. In this embodiment, surface oxidized NiP seed layer 51A, 51B, has a thickness of about 400 Å to about 500 Å. Surface oxidized NiP seed layer 51A, 51B can be formed by sputter depositing a layer of NiP in an inert gas atmosphere and subsequently oxidizing the surface of the deposited NiP seed layer in an atmosphere containing oxygen. Alternatively, the NiP seed layer can be sputter deposited in an oxygen-containing environment, whereby an oxidized seed layer is sputter deposited directly on non-magnetic substrate 50.

In embodiments of the present invention, a Cr or Cr-alloy sub-underlayer 52A, 52B, is deposited directly on surface oxidized NiP seed layer 51A, 51B. In the depicted embodiment, Cr-containing sub-underlayer 52A, 52B has a thickness of about 70 Å to about 1,000 Å.

An NiAl (or FeAl) underlayer 53A, 53B is deposited on Cr-containing sub-underlayer 52A, 52B. In the depicted embodiment, NiAl underlayer has a thickness of about 40 Å to about 700 Å. Advantageously, Cr-containing sub-underlaying 52A, 52B can be sputtered deposited employing conventional DC magnetron sputtering at low temperatures, e.g., room temperatures to about 65° C., preferably about room temperature, i.e., 25° C., thereby obtaining an underlayer structure exhibiting a (200)-dominant crystallographic orientation with a fine grain size.

An intermediate layer 54A, 54B, such as a Cr or Cr-alloy, is sputter deposited on NiAl underlayer 53A, 53B. In the depicted embodiment, Cr-containing intermediate layer 54A, 54B has a thickness of about 80 Å to about 1,900 Å. The increased thickness of the NiAl underlayer and intermediate layer, e.g. 53A and 54A, provides increased coercivity, tested up to 2,600 Å.

A magnetic alloy layer 55A, 55B, typically a magnetic Co alloy, is deposited on intermediate layer 54A, 54B. A protective overcoat 56A, 56B, such as carbon, and a lubricant top-coat 57A, 57B, are then sequentially deposited on magnetic alloy layer 55A, 55B.

As used throughout this application, the expression "(200)-dominant crystallographic orientation" with respect to an underlayer and intermediate layer denotes that the ratio of the number of underlayer and intermediate layer grains exhibiting a (200)-crystallographic orientation to the number of underlayer and intermediate layer grains exhibiting non (200)-crystallographic orientations is greater than 1, as determined by X-ray diffraction curves. As used throughout this application, the expression (110) or (112)-dominant crystallographic orientation denotes that the ratio of the number of underlayer and intermediate layer grains exhibiting a (110) or (112)-crystallographic orientation to the number of underlayer and intermediate layer grains exhibiting non (110) or (112)-crystallographic orientation is greater than 1 as determined by X-ray diffraction curves. As used throughout this application, the expression "(11$\bar{2}$0)-dominant crystallographic orientation" in the context of a Co-alloy magnetic layer denotes that the number of Co-alloy grains exhibiting a (11$\bar{2}$0)-crystallographic orientation to the number of Co-alloy grains exhibiting (10$\bar{1}$1)- and (10$\bar{1}$0)-crystallographic orientations is greater than 1, as determined by X-ray diffraction curves.

EXAMPLES

Magnetic recording media of embodiments of the present invention were prepared comprising cobalt-chromiumplatinum-tantalum (CoCrPtTa) magnetic layers on different intermediate layers, underlayer structures and seed layers, deposited using in-line DC magnetron sputtering. Glass-ceramic substrates were employed. The structures of the intermediate layers, underlayers, and seed layers, underlayer deposition temperatures and dominant crystallographic orientations of the underlayers and intermediate layers are set forth in Table 1.

TABLE 1

| Structure | Underlayer Deposition Temperture | (200)-Doimant Crystallographic Orientation |
|---|---|---|
| 1900 Å CrV/650 Å NiAl/ 950 Å Cr/oxidized NiP | room temperature (about 25° C.) | yes |
| 1900 Å CrV | room temperature (about 25° C.) | no |
| 1700 Å CrV/650 Å NiAl/ oxidized NiP | 250° C. | no |
| 1900 Å CrV/650 Å NiAl | 250° C. | no |
| 1900 Å CrV/650 Å NiAl/ 950 Å Cr | 260° C. | no |
| 1900 Å CrV/650 Å NiAl/ 950 Å Cr/oxidized NiP | 60° C. | yes |

Figure 6:
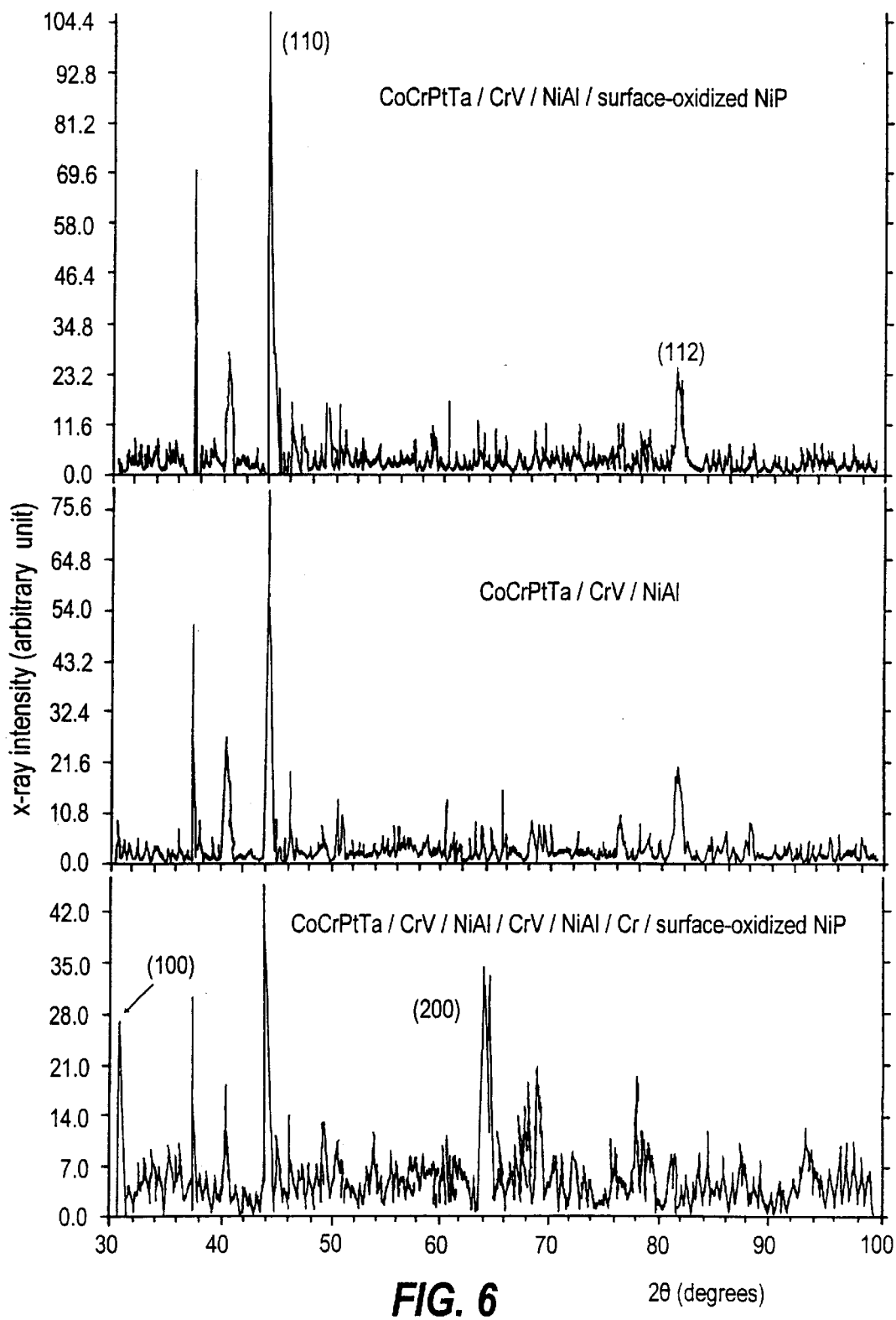
FIG. 6 shows X-ray diffraction curves of CoCrPtTa films deposited on different substructures utilizing glass ceramic substrates.
Figure 7:
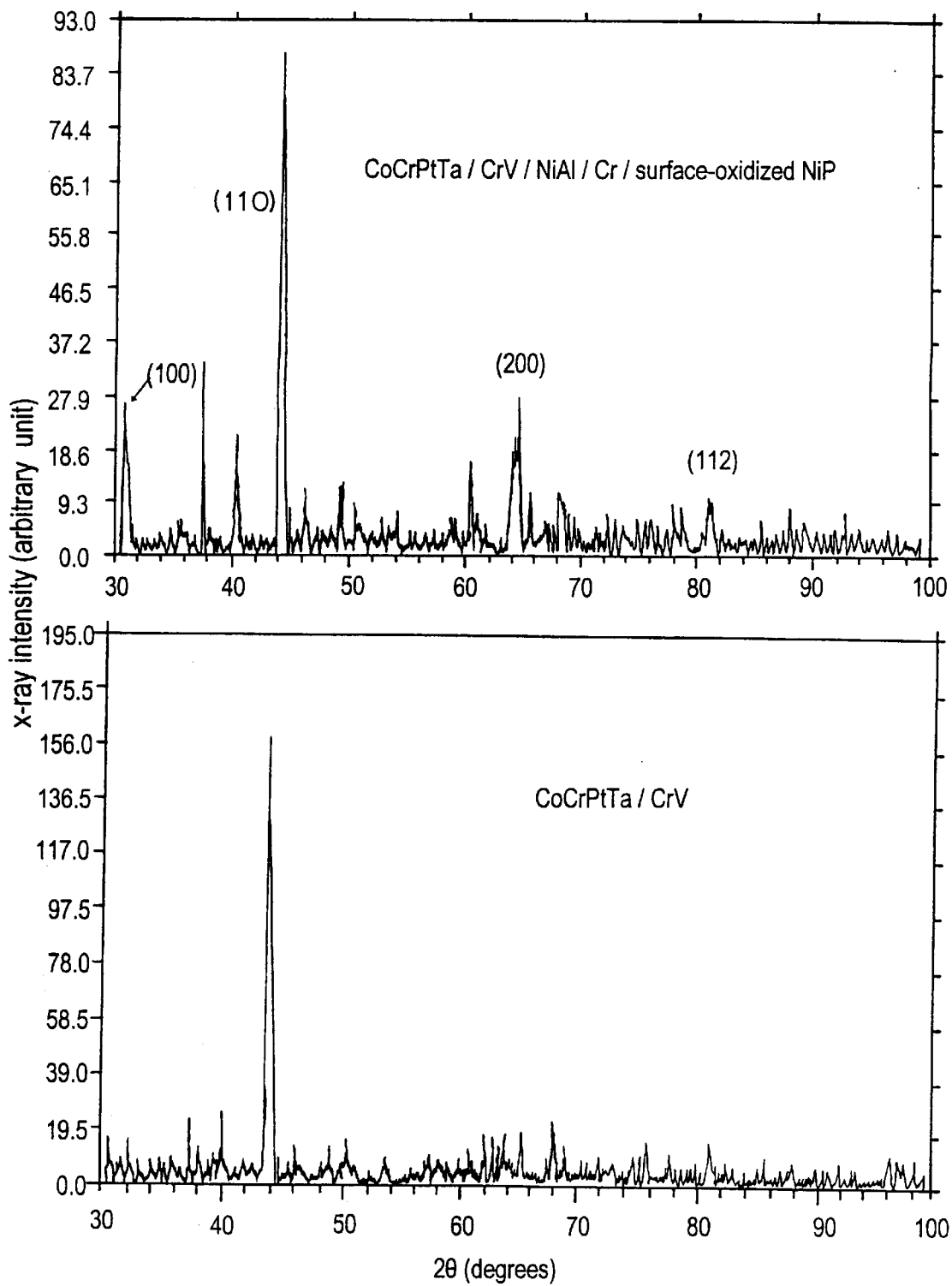
FIG. 7 shows X-ray diffraction curves of CoCrPtTa films on different substructures utilizing glass ceramic substrates.
Figure 8:
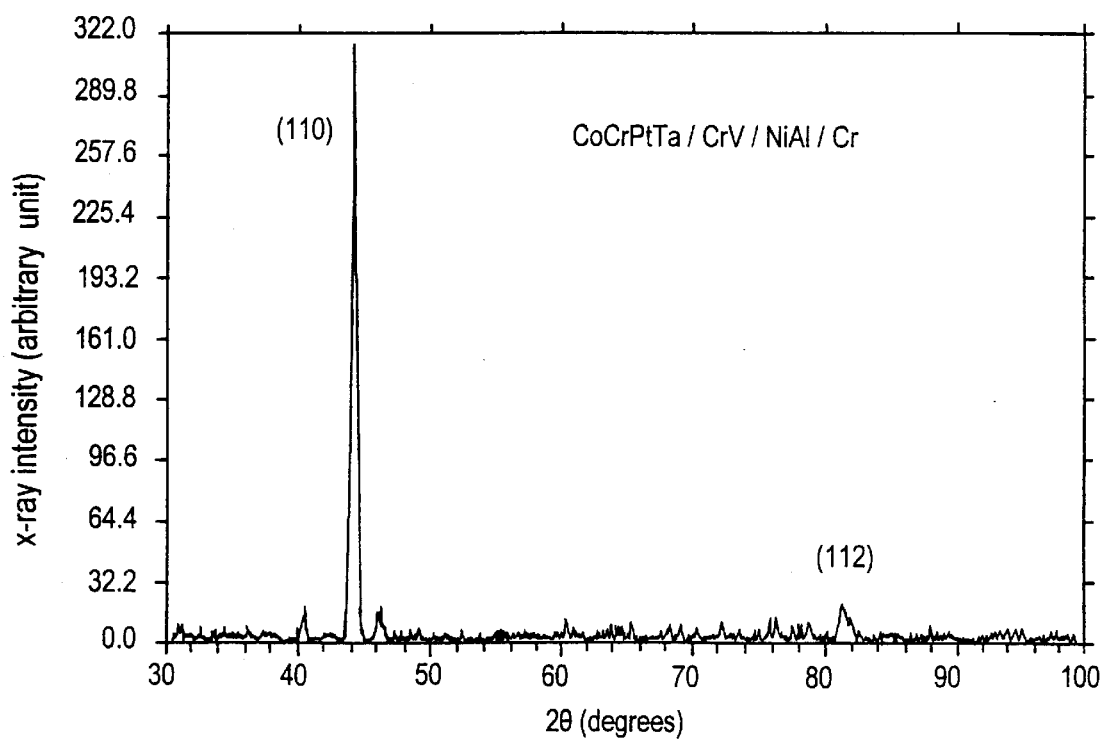
FIG. 8 shows X-ray diffraction curve of 290 Å CoCrPtTa/ 1900 Å CrV/650 Å NiAl/950 Å Cr directly deposited on a glass ceramic substrate at about 260° C.

Table 1 summarizes the results of X-ray diffraction measurements of CoCrPtTa magnetic layers deposited on different intermediate layer, underlayer, and seed layer structures at different temperatures. The X-ray diffraction curves are shown in FIGS. 6, 7 and 8. Table 1 illustrates the dependance of the crystallographic orientation of the intermediate layer and underlayer on structure, deposition temperature and seed layer.

Table 2 shows the X-ray diffraction intensity factors of bulk Cr published by JCPDS-International Center for Diffraction Data. It is apparent that the intensity factor of (200) is only one-sixth that of (110). Accordingly, if (200) and (110) have peaks of similar intensity on X-ray diffraction curves, (200) is the dominant texture.

TABLE 2

| Diffraction | Intensity Factor |
|---|---|
| (110) | 100 |
| (200) | 16 |
| (112) | 30 |

In FIG. 6, the 290 Å CoCrPtTa/1700 Å CrV/650 Å NiAl (top curve) and 290 Å CoCrPtTa/1900 Å CrV/650 Å NiAl (middle curve) were deposited at about 250° C. on surface oxidized NiP and directly on a glass ceramic substrate, respectively. The 290 Å CoCrPtTa/1900 Å CrV/650 Å NiAl/950 Å Cr (bottom curve) were deposited at about 60° C. on surface oxidized NiP.

In FIG. 7, the 290 Å CoCrPtTa/1900 Å CrV/650 Å NiAl/950 Å Cr (top curve) and the 290 Å CoCrPtTa/1900 Å CrV were deposited at room temperature (about 25° C.) on surface oxidized NiP and directly on a glass ceramic substrate, respectively.

Adverting to FIGS. 6 and 7, it is apparent that (200) is not the dominant texture of the intermediate layer and underlayer structure in the absence of a Cr-containing sub-underlayer directly on surface oxidized NiP seed layer.

Adverting to FIG. 8, it is apparent that (200) is not the dominant texture of the film with a Cr sub-underlayer deposited at high temperature such as 260° C., and directly on a glass ceramic substrate using in-line DC magnetron sputtering. Although Li-Lien et al., "Seed layer induced (002) crystallographic texture in NiAl underlayers," J. Appl. Phys. 79 (8), Apr. 15, 1996, pp. 4902–4904, obtained (200) crystallographic orientation for the films with Cr sub-underlayer deposited at 260° C. and on glass substrates using RF sputtering, FIG. 8 demonstrates that it is not feasible to obtain (200) texture for the films with Cr sub-underlayers directly deposited on glass or glass ceramic substrates using in-line DC magnetron sputtering, even at elevated substrate temperature such as 260° C. However, magnetic recording media having an underlayer structure comprising a Cr or Cr-alloy sub-underlayer deposited directly on surface oxidized NiP seed layer, even at about 25° C., exhibit a (200)-dominant crystallographic orientation. Thus, underlayer structures comprising a Cr-containing sub-underlayers deposited on surface oxidized NiP layers at low temperature lose the (110) and (112) texture dominance.

Figure 9:
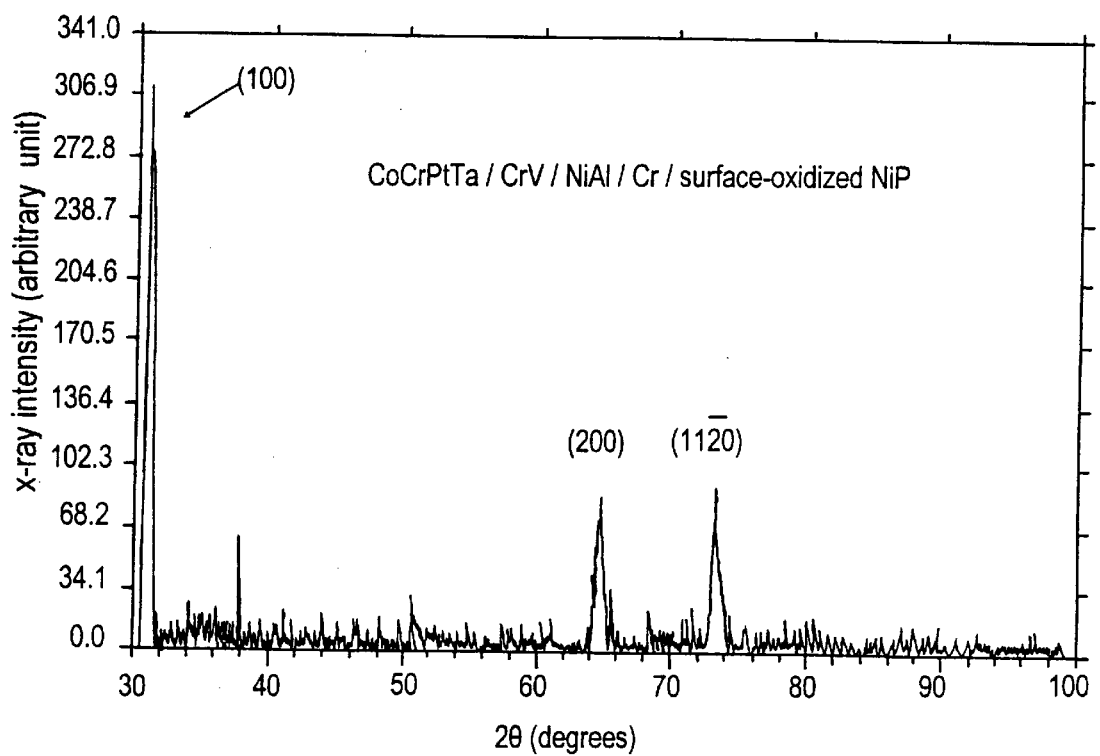
FIG. 9 shows X-ray diffraction curve of 340 Å CoCrPtTa/ 80 Å CrV/120 Å NiAl/100 Å Cr deposited on surface oxidized NiP at room temperature (about 25° C.) utilizing glass ceramic substrates.

FIG. 9 is an X-ray diffraction pattern of 340 Å CoCrPtTa/80 Å CrV/120 Å NiAl/100 Å Cr deposited on surface-oxidized NiP seed layer at room temperature (about 25° C.) using DC magnetron sputtering. The pattern exhibits a very strong Co alloy ($11\bar{2}0$) peak. It is apparent that the desirable Co alloy ($11\bar{2}0$) texture epitaxially grown on underlayer and intermediate layer (200) texture was obtained according with the present invention.

Table 3 compares magnetic properties of a conventional magnetic recording medium comprising a CoCrPtTa/CrV structure with a medium fabricated according to the present invention. The magnetic properties were measured with a remanent moment magnetometer (RMM). Hcr (remanent coercivity) and Mrt (magnetic remanance×film thickness) of the media are reported. The CoCrPtTa and CrV layers of both samples were deposited under identical conditions, including target power, pallet speed, Ar pressure and CrV and CoCrPtTa film thickness. Both samples were deposited at room temperature. Signal-to-medium noise ratio (SNR) was tested through a Guzik 1601 read-write analyzer connected to a Guzik 1701 spinstand. A composite head with an inductive element for writing and a magnetoresistive element for reading was used. The medium noise was measured by integrating the noise power spectrum over a bandwidth of 40 MHz and subtracting off DC noise and noise from electronics at the linear density of 180 thousand of flux reversals per inch (KFCI).

TABLE 3

| Structure | Hcr (Oe) | Mrt (memu/cm$^2$) | SNR (dB) |
|---|---|---|---|
| CrV | 1930 | 0.9 | 18.5 |
| CrV/NiAl/Cr/oxidized NiP | 2565 | 0.9 | 20.6 |

The data in Table 3 reveal that magnetic recording media having a CrV intermediate layer and a composite underlayer structure comprising NiAl and Cr-containing sub-underlayers deposited directly on surface-oxidize NiP seed layers exhibit high SNR and a coercivity enhancement greater than 600 Oe vis-à-vis conventional magnetic recording media. All CoCrPtTa films, intermediate layers, underlayers and seed layers were deposited on Ohara glass substrates at about 10 mTorr of Ar pressure utilizing DC magnetron sputtering without substrate bias. The NiP films were sputter deposited and subsequently oxidized in 5 mTorr of an atmosphere of 20% oxygen and 80% argon by volume for about 30 seconds at a temperature of about 25° C. Subsequently the underlayers and magnetic layers were sequentially sputtered deposited. The film compositions are shown in Table 4.

TABLE 4

| Layer | CoCrPtTa | CrV | NiAl | NiP |
|---|---|---|---|---|
| Composition (atomic) | 73/15/11/4 | 80/20 | 50/50 | 75/25 |

It was also found that film coercivity is improved by deposition at an elevated temperature. The magnetic properties of CoCrPtTa films deposited on a variety of intermediate layer, underlayer, and seed layer structures at a temperature of about 250° C. are compared in Table 5.

TABLE 5

COMPARISON OF MAGNETIC PROPERTIES OF CoCrPtTa FILMS DEPOSITED ON VANITIES OF UNDERLAYERS WHICH WERE DEPOSITED AT ABOUT 250° C.

| Structure | Hcr (Oe) | Mrt (memu/cm$^2$) |
|---|---|---|
| 650 Å NiAl/oxidized NiP | 1480 | 0.91 |
| 1700 Å CrV/oxidized NiP | 2770 | 1.01 |
| 160 Å CrV/650 Å NiAl/75 Å Cr/oxidized NiP | 3210 | 1.04 |

It is apparent from Table 5 that magnetic recording media having a structure comprising a Cr-containing intermediate layer, NiAl underlayer and Cr-containing sub-underlayer, exhibits a coercivity much greater than magnetic recording media having a single underlayer.

Figure 10:
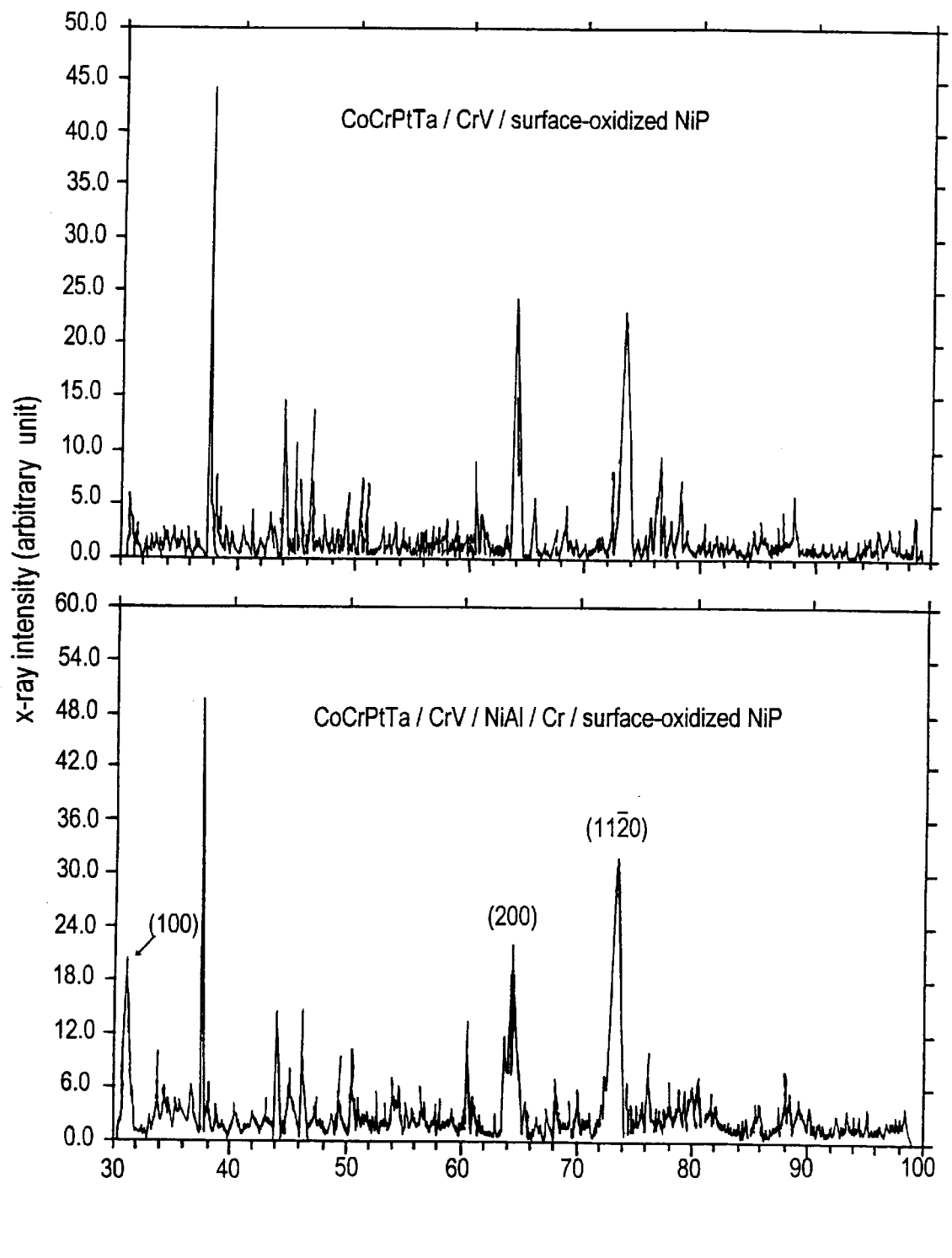
FIG. 10 shows X-ray diffraction curves of 290 Å CoCrPtTa/290 Å CrV and 290 Å CoCrPtTa/90 Å CrV/160 Å NiAl/110 Å Cr deposited on surface oxidized NiP at about 250° C. utilizing glass ceramic substrates.

Another two samples were fabricated under identical deposition conditions except for the structure of intermediate layer, underlayer and seed layers. The thickness of underlayers was adjusted to obtain similar remanent coercivity (Hcr). The X-ray diffraction curves of these two samples are shown in FIG. 10. Again, the media in accordance with the present invention have not only a (200)-dominant intermediate layer and underlayer crystallographic orientation, but also a (11$\bar{2}$0)-dominant Co alloy crystallographic orientation. The magnetic properties and recording performance of these two samples are listed in Table 6. The SNR was tested under the linear density of 156 KFCI and with a head with different quality from the head used for testing the samples in Table 3.

TABLE 6

| Structure | Hcr (Oe) | Mrt (mEMU/cm$^2$) | SNR (dB) |
|---|---|---|---|
| 290 Å CrV/oxidized NiP | 2530 | 1.02 | 18.9 |
| 90 Å CrV/160 Å NiAl/110 Å Cr/oxidized NiP | 2530 | 0.99 | 19.5 |

Even though both the media in Table 6 show a dominant Co alloy (11$\bar{2}$0) and underlayer (200) crystallographic orientation, the data show that the media in accordance with the present invention exhibit a higher SNR than the media without an NiAl underlayer.

The above examples demonstrate that magnetic recording media exhibiting extremely high coercivity e.g. about 2500 and about 3200 Oe and low noise, are obtained by depositing a Co alloy magnetic layer on a composite structure comprising Cr-containing intermediate layer, NiAl underlayer and Cr-containing sub-underlayer deposited on a surface oxidized NiP seed layer. The deposition of a Cr-containing sub-underlayer deposited directly on a surface oxidized NiP seed layer yields a (200)-dominant crystallographic underlayer orientation, even at room temperature, with DC magnetron sputtering. The Co alloy layer can have a (11$\bar{2}$0)-dominant crystallographic orientation. Thus, in accordance with the present invention, an efficient technique is provided utilizing in place conventional sputtering systems to fabricate a magnetic recording media exhibiting high coercivity and low noise, which magnetic recording media is suitable for very high density longitudinal recording.

The substrates employed in the present invention can advantageously comprise any of various substrates conventionally employed in the manufacture of magnetic recording media, including various glass or glass-ceramic materials. Conventional glass-ceramic materials are typically formed by a surface treatment to form a thin crystallized layer of ceramic thereon. Some forms of conventional glass-ceramic material are referred to as "Ohara glass."

The intermediate layer and sub-underlayer of the present invention can comprise any Cr-containing alloy used as underlayer conventionally employed in the manufacture of magnetic recording media, including, but not limited to, Cr, CrV, CrTi, CrMo.

The magnetic layer of the present invention can comprise any magnetic alloy conventionally employed in the production of magnetic recording media. Such alloys include, but are not limited to, Co-based alloys such as CoCr, CoCrTa, CoNiCr, CoCrPtTa, CoCrPt, CoNiPt, CoNiCrPt and CoCrPtB. The thickness of the magnetic layer is consistent with the thickness of magnetic layers of conventional magnetic recording media. A Co-base alloy having a thickness of about 100 Å to about 1000 Å, such as about 200 Å to 500 Å, has been found suitable.

As in conventional magnetic recording media, a protective overcoat can be deposited on the magnetic layer by any conventional means, such as sputtering. Protective overcoats can comprise zirconium oxide ($ZrO_2$), carbon, including hydrogenated carbon, silicon carbide (SiC), or a carbon nitride (CN). The protective overcoat is provided in a thickness suitable to protect the underlying layers. An overcoat having a thickness of about 50 Å to about 300 Å, such as about 100 Å to 200 Å has been found suitable.

As in conventional magnetic recording media, a layer of a lubricant can be applied on and bonded to the overcoat. The lubricant topcoat can be provided in any suitable thickness. A lubricant thickness of about 5 Å to 50 Å, such as about 10 Å to about 20 Å, has been found suitable.

The present invention is not limited to the specific examples disclosed herein or the particular materials previously exemplified or mentioned. The magnetic recording media of the present invention can comprise any of various types of glass or glass-ceramic substrates, and various types of magnetic alloy layers, including various Co-based alloy magnetic layers. The magnetic recording media of the present invention enjoy utility in various applications, particularly applications wherein high density is required, such as a magnetic rigid disk medium for longitudinal recording.

Only certain embodiments of the invention and but a few examples of its versatility are shown and described in the present disclosure. It is to be understood that the invention is capable of use in various other combinations and environments and is capable of changes or modifications within the scope of the inventive concept as expressed herein.

What is claimed is:

1. A magnetic recording medium comprising:

a non-magnetic substrate;

a seed layer on the non-magnetic substrate, the seed layer having an oxidized surface;

a chromium-containing sub-underlayer on the oxidized surface of the seed layer;

a nickel-aluminum or iron-aluminum underlayer on the chromium-containing sub-underlayer;

a chromium-containing intermediate layer on the nickel-aluminum or iron-aluminum underlayer; and a magnetic layer on the intermediate layer, wherein the underlayer and intermediate layer exhibit a (200)-dominant crystallographic orientation.

2. The magnetic recording medium according to claim 1, wherein the seed layer comprises nickel-phosphorous.

3. The magnetic recording medium according to claim 1, comprising a nickel-aluminum underlayer.

4. The magnetic recording medium according to claim 1, comprising a cobalt alloy magnetic layer.

5. The magnetic recording medium according to claim 4, wherein the cobalt alloy comprises cobalt, chromium, platinum and tantalum.

6. The magnetic recording medium according to claim 1, wherein the sub-underlayer comprises chromium or a chromium alloy and exhibits a (200)-dominant crystallographic orientation.

7. The magnetic recording medium according to claim 6, wherein the sub-underlayer comprises chromium.

8. The magnetic recording medium according to claim 6, wherein the sub-underlayer comprises a chromium-vanadium alloy.

9. The magnetic recording medium according to claim 1, wherein the intermediate layer comprises chromium or a chromium alloy.

10. The magnetic recording medium according to claim 9, wherein the intermediate layer comprises chromium.

11. The magnetic recording medium according to claim 9, wherein the intermediate layer is a chromium-vanadium alloy.

12. The magnetic recording medium according to claim 1, having a coercivity of about 2500 to about 4000 Oersteds.

13. The magnetic recording medium according to claim 1, further comprising;

a protective overcoat on the magnetic layer; and a lubricant topcoat on the protective overcoat.

14. A method of manufacturing a magnetic recording medium, which method comprises:

depositing a chromium-containing sub-underlayer on an oxidized surface of a seed layer;

depositing a nickel-aluminum or iron-aluminum underlayer on the chromium-containing sub-underlayer;

depositing a chromium-containing intermediate layer on the nickel-aluminum or iron-aluminum underlayer; and depositing a magnetic layer on the intermediate layer, wherein
    the underlayer and intermediate layer exhibit a (200)-dominant crystallographic orientation.

15. The method according to claim 14, wherein the seed layer comprises nickel-phosphorous.

16. The method according to claim 14, comprising depositing a nickel-aluminum underlayer on the chromium-containing sub-underlayer.

17. The method according to claim 14, comprising:

depositing the seed layer on a non-magnetic substrate; and oxidizing the surface of the deposited seed layer.

18. The method according to claim 14, comprising oxidizing the surface of the seed layer in the presence of oxygen.

19. The method according to claim 17, wherein the seed layer comprises nickel-phosphorous.

20. The method according to claim 14, comprising depositing an oxidized seed layer on a non-magnetic substrate.

21. The method according to claim 20, comprising sputter depositing an oxidized seed layer in an atmosphere containing oxygen.

22. The method according to claim 20, wherein the seed layer comprises nickel-phosphorous.

23. The method according to claim 14, comprising depositing the sub-underlayer by (DC) direct current magnetron sputtering at a temperature as low as about 25° C.

* * * * *